(12) United States Patent
Warkotsch et al.

(10) Patent No.: US 8,604,437 B2
(45) Date of Patent: Dec. 10, 2013

(54) METHOD AND ARRANGEMENT FOR MEASURING AND TESTING A VEHICLE FRAME

(75) Inventors: Dirk Warkotsch, Burgwedel/Wettmar (DE); Alexander Eberle, Kempten (DE); Tilo Janz, Burgwedel/Kleinburgwedel (DE); Harald Schenitzki, Garbsen (DE)

(73) Assignee: Haweka AG, Burgwedel (DE)

( * ) Notice: Subject to any disclaimer, the term of this patent is extended or adjusted under 35 U.S.C. 154(b) by 0 days.

(21) Appl. No.: 13/704,412

(22) PCT Filed: Sep. 21, 2011

(86) PCT No.: PCT/EP2011/004716
§ 371 (c)(1),
(2), (4) Date: Feb. 20, 2013

(87) PCT Pub. No.: WO2012/038074
PCT Pub. Date: Mar. 29, 2012

(65) Prior Publication Data
US 2013/0200264 A1    Aug. 8, 2013

(30) Foreign Application Priority Data

Sep. 23, 2010 (DE) .......................... 10 2010 046 176
Sep. 27, 2010 (DE) .......................... 10 2010 046 543
Mar. 25, 2011 (DE) .......................... 10 2011 015 172

(51) Int. Cl.
*G01B 5/00* (2006.01)
(52) U.S. Cl.
USPC .......................... 250/341.8; 33/288
(58) Field of Classification Search
USPC .......................... 250/341.8; 33/288
See application file for complete search history.

(56) References Cited

U.S. PATENT DOCUMENTS

| | | |
|---|---|---|
| 4,691,443 A | 9/1987 | Hamilton et al. |
| 5,207,002 A | 5/1993 | Humblet |
| 5,852,241 A | 12/1998 | Fagerdahl et al. |
| 7,874,078 B2 | 1/2011 | Harrill et al. |

*Primary Examiner* — David Porta
*Assistant Examiner* — Abra Fein
(74) *Attorney, Agent, or Firm* — Roberts Mlotkowski Safran & Cole, P.C.; David S. Safran

(57) ABSTRACT

A method for measuring and testing a vehicle frame (15), in particular a commercial vehicle or bus frame, wherein a radiation source and a radiation receiver are arranged in front of the frame (15) and radiation is beamed from the radiation source toward the frame (15) and onto a reflector support (1) having at least one reflector (2, 3, 4, 5). The reflector (2, 3, 4, 5) is assigned to a part of the frame (15), and the radiation is reflected by the reflector (2, 3, 4, 5) to the radiation receiver and a measuring device determines location coordinates of the reflector (2, 3, 4, 5) at different measuring points of the frame part. A substantially non-deformed section (A) of the frame part is ascertained from the resulting measuring points (P) and the variation of the measuring points (P) from the non-deformed section (A) is determined.

7 Claims, 10 Drawing Sheets

METHOD AND ARRANGEMENT FOR MEASURING AND TESTING A VEHICLE FRAME

BACKGROUND OF THE INVENTION

1. Field of the Invention

The invention relates to a method and arrangement for measuring and testing a vehicle frame, especially a truck frame or bus frame.

2. Description of Related Art

The prior art already discloses methods for measuring and testing a vehicle frame, on a rim of a vehicle wheel an axle measurement holder for a laser source and for a measurement scale being attached from the outside. From the outside, a reflector is attached to the frame and reflects a laser beam emitted by the laser source in the direction to the measurement scale on the axle measurement holder. If the reflector is attached to different locations of the frame and a laser beam measurement is taken at each location, the deformation of the frame can be deduced from the deviation of the laser incidence points on the measurement scale. There is a corresponding laser source with a measurement channel and a reflector on each longitudinal side for measuring the vehicle frame.

It is disadvantageous in the known methods for measuring and testing of vehicle frames that possibly add-on parts on the frame must be removed in order to attach the reflector to the frame; this is labor-intensive and time-consuming. Otherwise, the reflector which projects laterally far above the frame in the longitudinal direction of the frame cannot be attached at just any point on the frame. Since the laser source projects over the vehicle wheel rim to the outside, the reflector must also extend accordingly far to the outside; this can lead to measurement errors in the frame measurement for certain deformations of the frame. This applies especially when on the two longitudinal sides of the vehicle there are corresponding measurement devices to measure the frame completely, i.e., on two longitudinal sides. Measurement errors can occur especially when the frame is bent around a vertical axis (major axis) of the vehicle and/or around the longitudinal axis.

A measurement system for wheel angles and for positions of the chassis units of a motor vehicle is disclosed by German Patent DE 695 22 937 T2 and corresponding to U.S. Pat. No. 5,852,241.

SUMMARY OF THE INVENTION

The object of this invention is to make available a method and an arrangement for measuring and testing a vehicle frame which allow less time-consuming and labor-intensive measuring and testing of the frame geometry and which are characterized by a high measurement accuracy in measurement and testing.

This object is achieved in a method of the initially named type in that a measurement device which has a radiation source and a radiation detector is located in front of the frame and radiation is emitted from the radiation source in the direction to the frame onto a reflector support with at least one reflector, the reflector being assigned to a part of the frame, the radiation being reflected by the reflector onto the radiation detector and the local coordinates of the reflector being determined by the measurement device at different measurement sites of the frame part preferably in the longitudinal direction of the frame and an essentially undeformed section of the frame part being determined from the measurement points which have been obtained in this way and the deviation of the acquired measurement points from the undeformed section being determined.

The frame part can preferably be an outer longitudinal beam of the frame. It is assigned at least one reflector so that the height profile and/or side profile of the longitudinal beam and the deformation of the beam in the longitudinal direction of the frame can be mapped by repeated detection of the local coordinates of the reflector at different sites of the longitudinal beam in the longitudinal direction of the frame. In particular, a straight line segment which corresponds to an undeformed region of the frame part or of the frame can be easily (graphically) determined from the disposition of the measurement points and the acquired local coordinates of the reflector in the longitudinal direction of the frame. This undeformed region and the straight line segment which is assigned to this region then represent the reference axis to which the distance of the individual measurement points as a measure of the deformation of the frame is determined.

A software-supported solution can, for example, provide that first the measurement points and the local coordinates (X, Y, Z coordinates) of the reflector which have been determined at the different measurement sites in the longitudinal direction (Z) of the frame are entered into a diagram which shows the plane in space which has been formed from the longitudinal direction of the frame and a horizontal or vertical transverse direction. With consideration of the distribution of the measurement points in space, then those measurement points can be selected which have been determined to be on an undamaged section of the frame part. These measurement points lie on a common straight line and establish a straight line segment with respect to its starting and ending points. The selection of the measurement points which can be assigned to a straight line segment can take place automatically or by visual acquisition of the measurement point distribution and selection of certain measurement points by an individual and/or with inspection of the deformation behavior on the vehicle frame.

Then, the deviation of all other measurement points from the straight line segment and a reference axis which is established by this or which runs parallel to the straight line segment is determined. Alternatively, on the basis of selected measurement points, a regression line can be determined and then the deviation of the measurement points from the regression lines can be ascertained. In addition, it is also possible to determine a compensation line for a plurality of measurement points which deviate as little as possible from a straight line and thus can be assigned to an undamaged section of the frame part. The allowable deviation between the local coordinates of one measurement point in the X, Y and/or Z direction from the determined straight line segment can be preferably less than 5%, especially less than 2%, so that one measurement point can still be assigned to the straight line segment. As a result, a possible deformation of the measured or tested frame part follows from the deviation of the measurement points in the X, Y and/or Z direction from the measurement points which have been assigned to an undamaged section of the frame part.

In particular, the respective distances in the two planes in space can be determined so that the deformations can be recognized in the horizontal and in the vertical transverse direction of the frame part. It goes without saying that a graphic display and an evaluation of the measurement points can be provided for subsequent repair measures on the frame.

The reflector in the method in accordance with the invention is assigned to at least one frame part, especially a longitudinal beam of the frame. In particular, the reflector can be held on the frame part and can be attached to the frame part, furthermore especially by means of a reflector support when the local coordinates are being determined. This will be explained in detail below. By offsetting or shifting the reflector along the frame part and determining the local coordinates at different measurement sites in the longitudinal direction of the frame, the shape of the frame part is preferably determined or mapped in all three directions of space. Here, the reflector which is assigned to one frame part should preferably have an identical constant distance in the horizontal and in the vertical transverse direction from the frame part at each measurement site.

The method in accordance with the invention does not assume that the geometrical center line of the frame is known or is being determined beforehand. In particular, the measurement device need not be aligned exactly to the geometrical center line of the frame in order to undertake the measurement of the frame. The measurement and testing of the vehicle frame are thus possible with little time consumption and low expenditure of effort. When a minimum distance which is dictated by the measurement engineering and which can be between 2 m to 5 m is maintained, with suitable execution of the measurement device, the measurement device can be fundamentally positioned anywhere in front of the frame or behind the frame in order to measure and test the frame.

According to the equipment, in an arrangement of the initially named type, in accordance with the invention, there can appropriately be a reflector support which has at least one reflector, a measurement device which has a radiation source and a radiation detector, and a computer device made for carrying out the method in accordance with the invention. In particular there can be a computer program with program code means for carrying out the method in accordance with the invention.

In one preferred embodiment of the invention, there are simultaneous measurement and testing of two opposite frame parts which extend in the longitudinal direction of the frame, especially of opposing outer longitudinal beams of the frame. For this purpose, the reflector support in the horizontal transverse direction can have a first outer reflector and opposite, a second outer reflector, the two outer reflectors being assigned to outer frame parts which are provided on opposite longitudinal sides of the frame and local coordinates of the reflectors being determined jointly by the measurement device. In this way, measurement and testing of the entire frame are easily possible with little time consumption and low expenditure of effort.

The two outer reflectors can be positioned in the horizontal direction preferably symmetrically relative to a geometrical center between the outer reflectors and relative to the center of the reflector support. In this connection, the reflector support can have two outer reflectors which are mounted adjustably relative to one another such that the outer reflectors always have an identical distance to the geometrical center regardless of the mutual distance. If the outer reflectors are assigned to opposing outer longitudinal beams of the frame or are joined to them, the distance between the outer reflectors is set according to the distance between the outer longitudinal beams of the frame. Here, preferably, the adjustment of a first outer reflector in the transverse direction can automatically lead to a correspondingly large adjustment of the oppositely arranged second outer reflector, so that it is ensured that both outer reflectors always have the same distance from the geometrical center.

The reflector support can also have two inner reflectors which are located fixed on the reflector support. The distance between the inner reflectors is constant. The inner reflectors consequently also have an identical distance from the geometrical center. The inner reflectors are preferably designed for determining the distance between the measurement device and the reflector support; this assumes a corresponding formation of an algorithm which is intended for determining the local coordinates.

The inner reflectors and the outer reflectors can be mounted on a common horizontal axis. In this connection, the reflectors can be synchronously adjustable in the vertical direction. In this way, the determination of the local coordinates is simplified. In this connection, the reflector support with the reflectors can be supported in an adjustable manner in the vertical direction on vertical stay bars which can be made for hanging and/or for attaching the reflector support on opposing longitudinal beams of the vehicle frame. The reflector support can then be adjusted up or down as necessary, preferably in height, however vertical adjustment not being undertaken during the determination of the local coordinates of the reflectors at different measurement sites in the longitudinal direction of the frame. It is easily possible by the reflector support which is adjustable in the vertical direction to take a frame measurement at a height at which disruption of the measurements by mounting parts or add-on parts of the frame is largely precluded, for example, underneath a differential transmission which is held on the frame.

In one preferred embodiment of the method in accordance with the invention, from the measurement points of the two outer reflectors, a geometrical center line of the frame is determined in a plane of space formed from the longitudinal direction Z of the frame and the horizontal transverse direction X and/or in a plane of space formed from the longitudinal direction Z of the frame and the vertical transverse direction Y. In addition, then, the respective distance of the measurement points from the geometrical center line can be determined. In particular, the geometrical center line is determined from those measurement points which can be or have been assigned to a straight line segment or an undeformed region of the frame. This can likewise take place automatically by a corresponding software solution.

The method in accordance with the invention allows the measurement sites at which the local coordinates of the reflectors for frame measurement are determined to be spaced at different distances from one another. There can be distances from 0.1 m to 1.0 m, preferably from roughly 0.2 to 0.5 m. In the region of a deformation of the frame, there can also be more measurement points in order to enable an especially exact determination of the deformation in this region.

In another aspect of this invention, which can also be implemented independently of the above described features of the method in accordance with the invention, it is provided that the reflector is located within the region which is bordered by the outside surfaces of the frame. If there are several reflectors on a reflector support, the reflector support can be positioned in the inner region of the frame or can be hung in the frame or suspended on the frame, preferably over outer longitudinal beams of the frame.

In contrast to the prior art, at this point, the invention does not call for attaching the reflector from the outside to the frame. In particular, the reflector in the method in accordance with the invention will not project laterally over the vehicle wheels or be located in the outer region of the frame. In this way, it is generally not necessary or is necessary only to a lesser extent to remove mounting parts or add-on parts on the frame to attach the reflector; this leads to lower costs and the saving of time in the measurement and testing of the vehicle frame. The reflector support can preferably be hung wherever there is enough open space in or on the frame. Compared to the prior art, several sites are thus available on the frame at which the reflector support can be positioned for a frame measurement. Otherwise, the inner reflectors, i.e., those located within the wheels of the vehicle, preclude or reduce measurement errors for certain deformations of the vehicle frame, and thus, ensure high measurement accuracy in the determination of the frame geometry.

In particular, there are a host of possibilities for embodying and developing the method in accordance and the arrangement in accordance with the invention, reference being made to the following detailed description of a preferred exemplary embodiment of the invention in conjunction with the accompanying drawings.

DETAILED DESCRIPTION OF THE INVENTION

Figure 1:
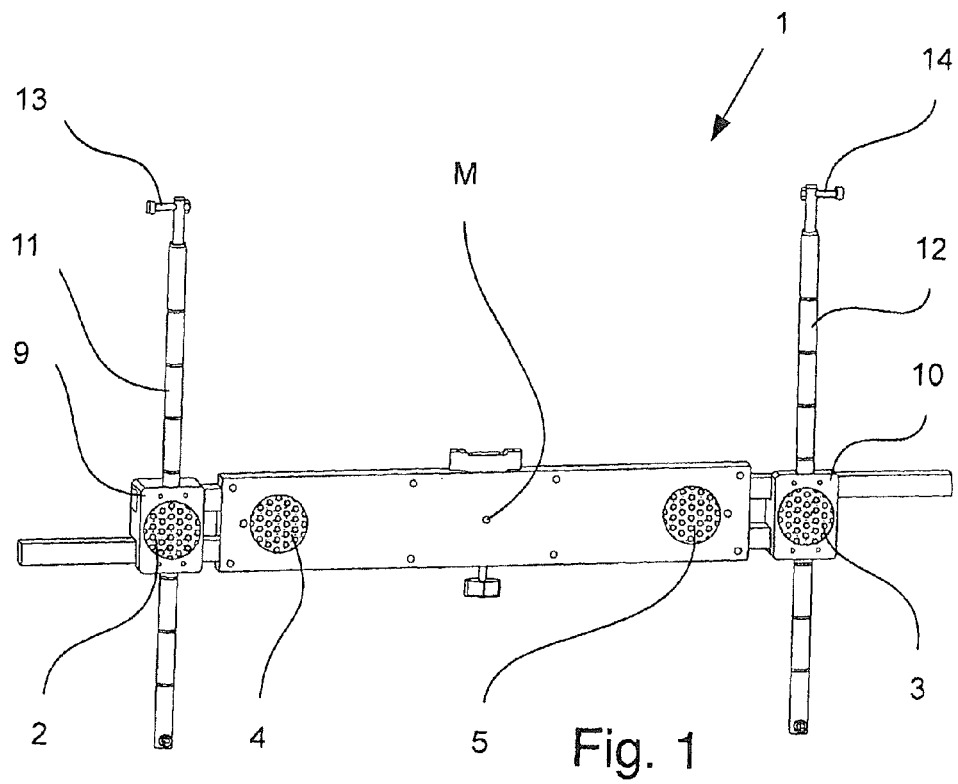
FIG. 1 shows a reflector support for use in a method according to the application for measuring and testing a vehicle frame in a view obliquely from the front.
Figure 2:
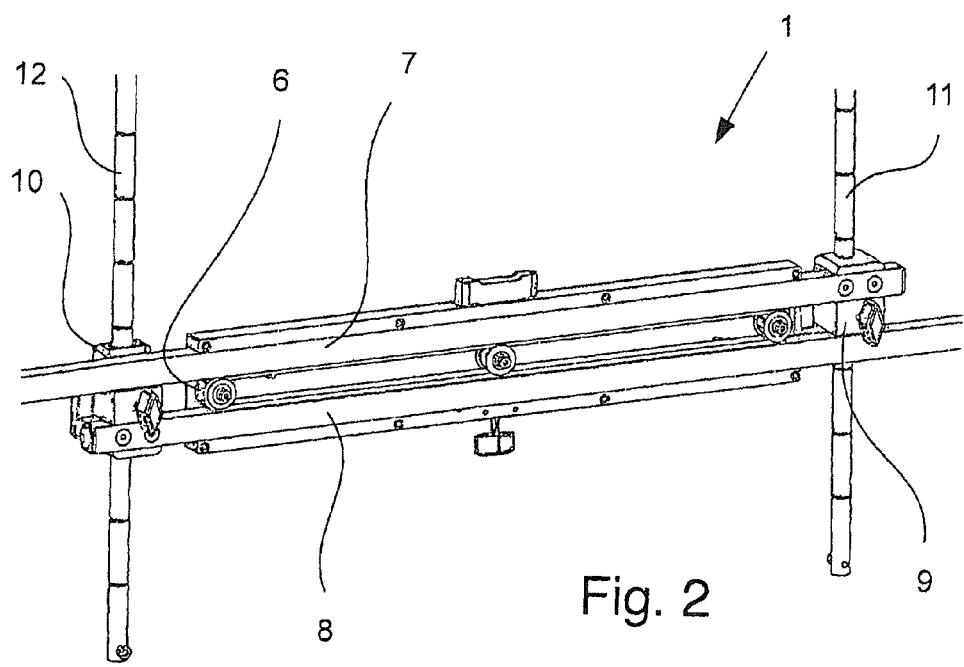
FIG. 2 shows the reflector support of FIG. 1 from the rear (after removing a covering sheet)

FIG. 1 shows a reflector support 1 with two outer reflectors 2, 3 and two inner reflectors 4, 5. As follows from FIG. 2, which shows the reflector support 1 of FIG. 1 from the rear after removing a covering sheet, the reflector support 1 has a belt 6 via which two horizontal rods 7, 8 are coupled to one another. The upper vertical rod 7 is permanently connected to a box profile 9 while the lower horizontal rod 8 is permanently connected to a box profile 10. The two box profiles 9, 10 are guided vertically adjustably on vertical rods 11, 12, the upper horizontal rod 7 being guided on the box profile 10 and the lower horizontal rod 8 being guided on the box profile 9. When the box profile 10 is pulled to the outside with the vertical rod 12, by means of belt 6, the box profile 9 with the right vertical rod 11 is automatically shifted to the other side by the deflection of the belt 6. The same principle can be implemented by racks which are coupled via a pinion and which are connected to the vertical rods 11, 12. The structural configuration of the reflector support 1 makes it possible for the two outer reflectors 2, 3 to be individually adjustable in the vertical direction and movable in the horizontal direction symmetrically to a geometrical center M between the reflectors 2, 3.

The two inner reflectors 4, 5 are arranged at a fixed distance relative to each other, the inner reflectors 4, 5 always having the same distance relative to the geometrical center M between the outer reflectors 2, 3.

Figure 4:
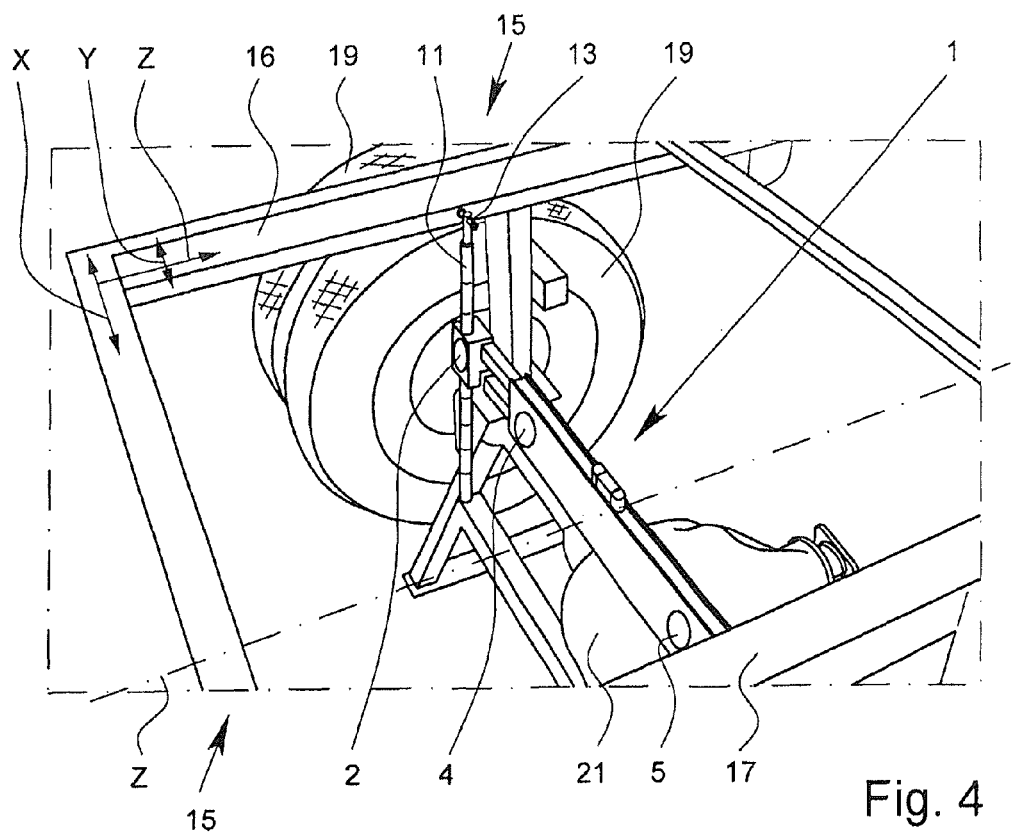
FIG. 4 is a perspective view of a reflector support as shown in FIGS. 1 to 3 hung on the frame of a truck.

As shown in FIG. 1, there are hanger means 13, 14 for hanging the reflector support 1 onto a frame 15 on the vertical rods 11, 12 of the reflector support 1, the vertical rods 11, 12 preferably being held on the longitudinal beams 16, 17 of the frame. This is shown for hanger means 13 in FIG. 4. Alternatively, there can be a clamping device to attach the reflector support 1 to the frame 15, and the clamping device can encompass the frame 15 and if necessary can be widened.

Figure 3:
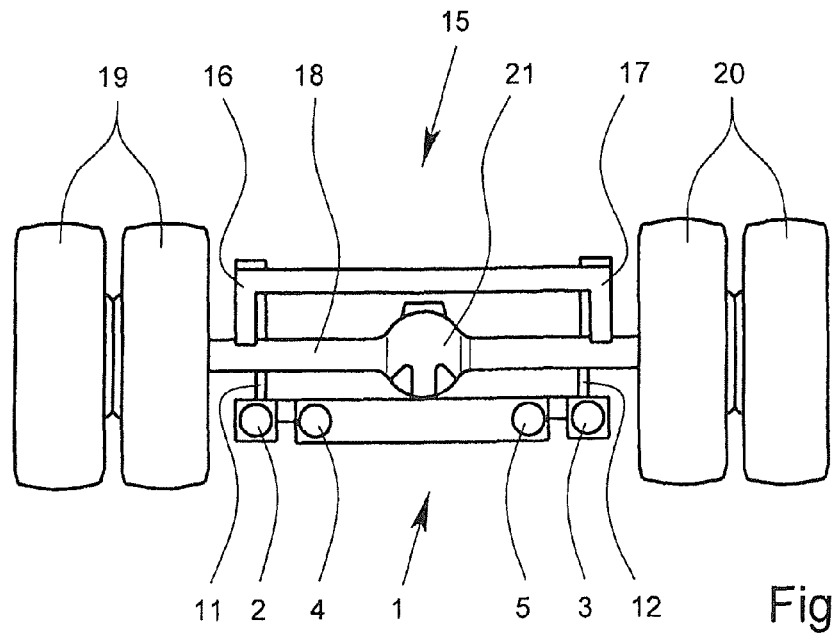
FIG. 3 is a schematic view of the reflector support of FIG. 1 hanging on a vehicle frame.

The frame 15 rests on the floor via wheels 19, 20 which are mounted on a wheel axle 18. As FIG. 3 in particular shows, the reflector support 1 is located essentially within a frame interior which is bordered by the longitudinal beams 16, 17 of the frame. In particular, the outer reflectors 2, 3 do not project to the outside over the wheels 19, 20 or are located outside the wheels 19, 20; this likewise follows from FIG. 3. Preferably, the reflector support 1 is located underneath a differential transmission 21.

The arrangement of all reflectors 2, 3, 4, 5 within the frame 15 allows measurement and testing of the frame geometry with little effort and time consumption, and the reflector support 1, if necessary, can be located anywhere on the frame 15 where hanging on the longitudinal beams 16, 17 of the frame is possible. Otherwise, measurement errors in frame measurement are reduced by the comparatively short length of the reflector support 1 and the comparatively short distance between the outer reflectors 2, 3.

For example, a method for measurement and testing of the frame 15 is explained below by way of example using FIGS. 5 to 9. First of all, the reflector support 1 as described is hung on the longitudinal beams 16, 17 of the frame at different measurement points in the longitudinal direction Z of the frame. The reflector support 1 can be hung under the frame 15 and does not have any support parts which extend far to the outside. For this reason, it is not necessary to remove add-on pieces on the frame 15 for the measurement and testing of frame 15. The reflector support 1 can be hung wherever there is corresponding open space. Wherever the frame 15 is damaged, measurement distances on the frame 15 can be chosen which are shorter than for an undamaged section of the fame 15.

In front of the reflector support 1 and the frame 15, there is a measurement device which has a radiation source (laser) and a radiation detector (camera) and radiation is emitted from the radiation source in the direction to the frame 15 onto the reflector support 1. Preferably, it is sufficient to align the radiation detector only roughly relative to the reflector support 1. In particular, it is not provided that the camera be exactly aligned to the geometrical center longitudinal axis of the frame 15. Here, the outer reflector 2 is assigned to the longitudinal beam 16 of the frame and the outer reflector 3 to the longitudinal beam 17 of the frame. Suspending the reflector support 1 via the vertical rods 11, 12 on the longitudinal beams 16, 17 of the frame ensures that the external reflectors 2, 3 are located in a certain position underneath the longitudinal beams 16, 17 of the frame. By pulling the vertical rods 11, 12 apart or pushing them together the distance between the external reflectors 2, 3 can be adjusted to the actual width of the frame 15 and to the distance between the longitudinal beams 16, 17 of the frame. As a result, each reflector 2, 3 follows the shape of the assigned longitudinal beams 16, 17 of the frame when measuring the frame 15 in the longitudinal direction Z of the frame.

A measurement device for measurement and testing of the frame 15 can have as the radiation source several infrared LEDs which for example emit light with a wavelength of 850 nm at an angle of ±15°. There is a digital camera to detect the light which has been reflected on the reflectors 2, 3, 4, 5. The camera can consist of an objective lens and a digital camera chip. The objective lens by optical imaging produces an image of all reflected objects on the camera chip. The detected region can be for example ±7.5°. Moreover there are electronics which are formed by a microprocessor system with storages, and the digital images of the camera chip can be read into the microprocessor system.

Figure 12:
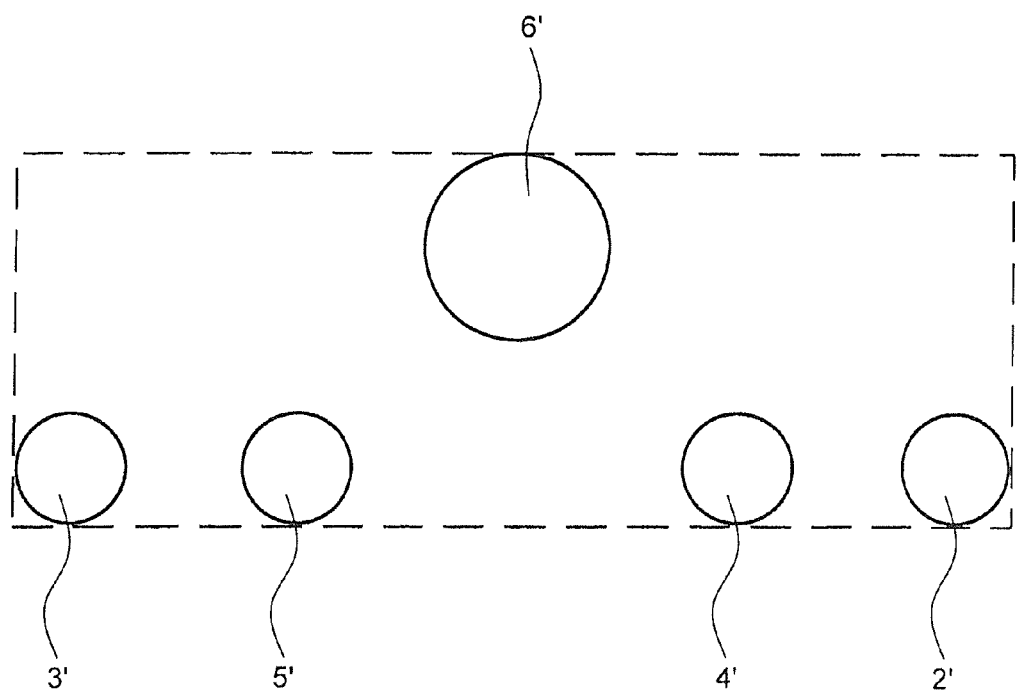
FIG. 12 is a representation of the reflector support recorded in the measurement and testing of the vehicle frame in accordance with the invention.

The electronics takes two pictures with the camera and triggers the infrared illumination such that the first picture is taken without illumination and the second is taken with illumination. The emitted light is reflected by the reflectors 2, 3, 4, 5 so that they appear in the second picture as bright circular regions 2', 3', 4', 5'. FIG. 12 shows a picture recording with illumination of the reflector support 1. The difference of the two pictures is then formed so that only the illuminated reflectors 2, 3, 4, 5 are visible. Uniform light such as comes from the sun is filtered out by this method. In addition, in front of the camera a daylight blocking filter can be mounted which optically filters out the light with a wavelength in the visible range, as can be emitted for example from a fluorescent tube.

The electronics then automatically determines the position of the bright regions 2', 3', 4', 5' in the picture. For this purpose first all white regions 2', 3', 4', 5', 6' are determined. A pixel is considered "white" when it exceeds a certain threshold value, otherwise it is regarded as "black". If the picture recording contains more than four white regions 2', 3', 4', 5', 6', it must be determined which regions 2', 3', 4', 5' are plausible, i.e. which regions go back to the reflection of the radiation on the reflectors 2, 3, 4, 5 and which further region 6' is not plausible, i.e. can be attributed to the reflection on another frame part or other object in the region of the frame 15.

The radiation emerging from the radiation source is reflected by the reflectors 2, 3, 4, 5 onto the radiation detector, by means of a suitable algorithm local coordinates of the reflectors 2, 3, 4, 5 being determined at different measurement sites in the longitudinal direction Z of the frame. The distance between the reflector support 1 and the measurement device in the longitudinal direction Z of the frame is preferably determined from the radiation which has been reflected from the inner reflectors 4, 5 onto the radiation detector. The radiation which has been reflected from the outer reflectors 2, 3 onto the radiation detector is preferably used to determine the local coordinates of the reflectors 2, 3 in the X and Y transverse direction.

Figure 5:
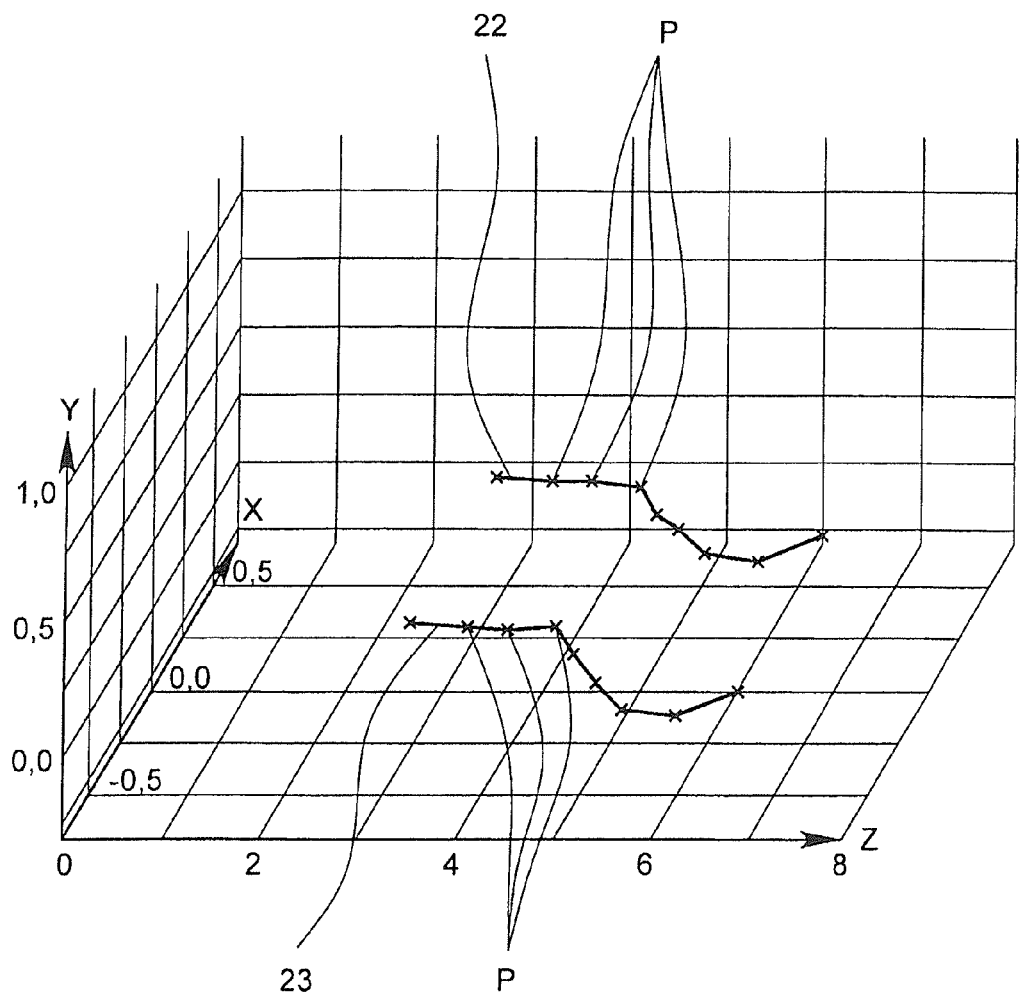
FIGS. 5-9 are plots of measured value representations of local coordinates of reflectors of the reflector support shown in FIGS. 1 to 4 in the measurement and testing of a vehicle frame of a truck.

The result of measuring the frame 15, i.e. the local coordinates (X, Y and Z coordinates) of the outer reflectors 2, 3 in FIG. 5, have been entered in a diagram as measurement points P, the upper line 22 being obtained by connecting the measurement points P which are fixed by the local coordinates of the outer reflector 2 in the longitudinal direction Z of the frame and the lower line is obtained by connecting the measurement points P which are fixed by the local coordinates of the outer reflector 3 in the longitudinal direction Z of the frame.

Figure 6:
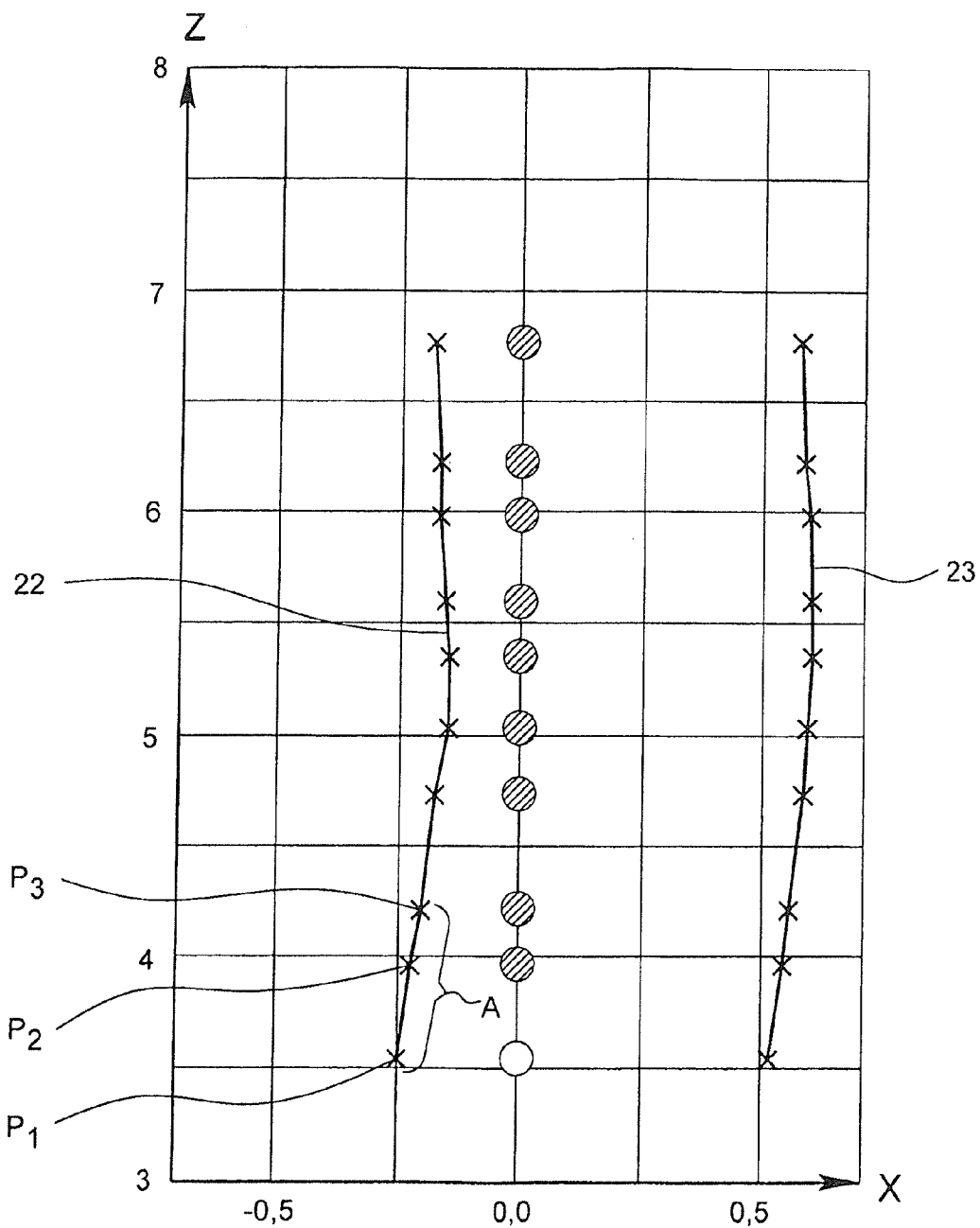
Figure 7:
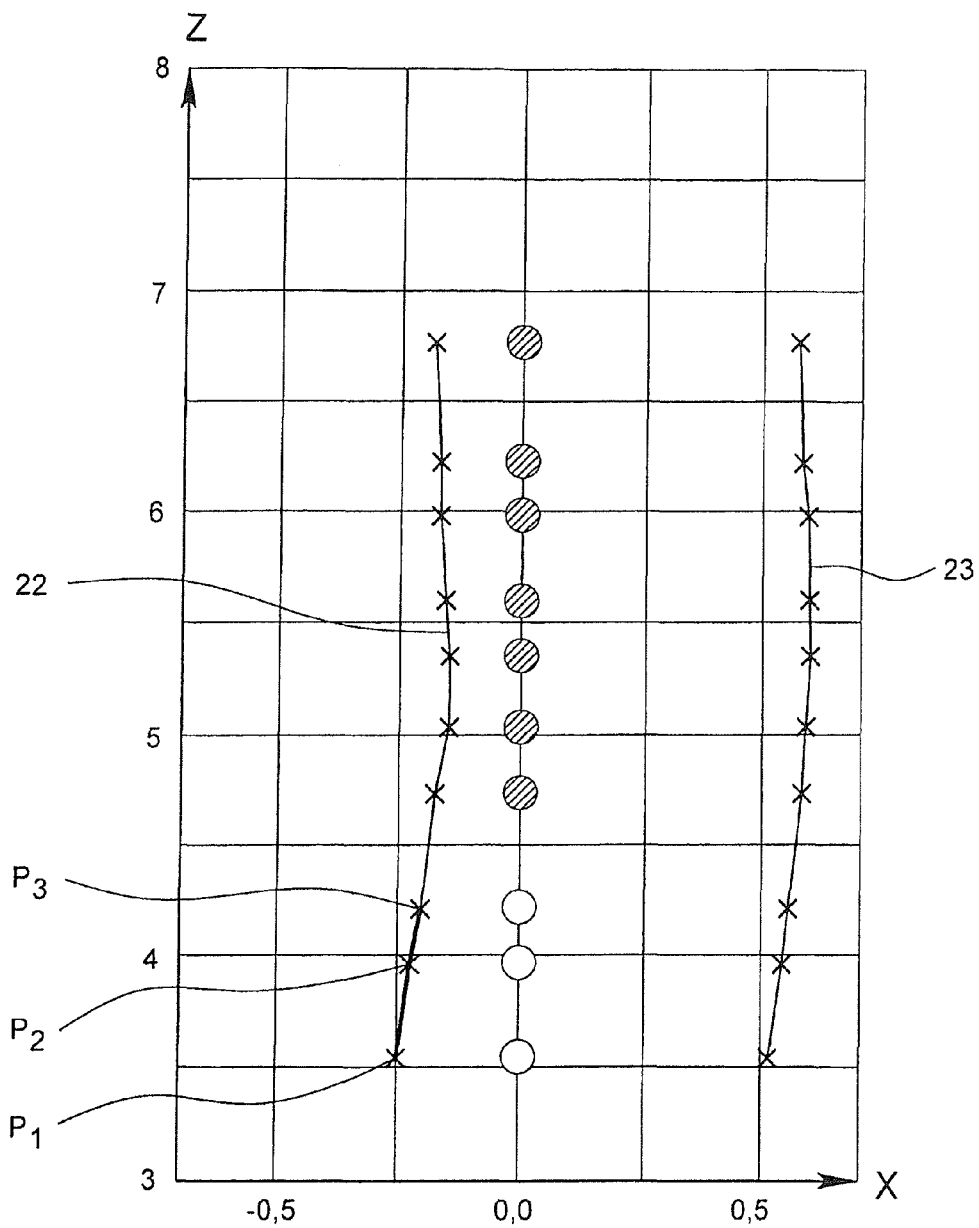

As is apparent from FIGS. 6 and 7, a straight line segment 24 is determined below in a plane of space formed from the longitudinal direction Z of the frame and the horizontal transverse direction X by selecting the measurement points P.

The straight line segment 24 is established by at least two measurement points P which have been detected on an undeformed (undamaged) section A of the frame 15. According to FIGS. 6 and 7, they are the first three measurement points $P_1$ to $P_3$ which lie on a common straight line. The straight line segment 24 which is bordered by the first measurement point $P_1$ and the third measurement point $P_3$ is used to align all measurement points P; this is apparent from a comparison of FIGS. 7 and 8.

Figure 8:
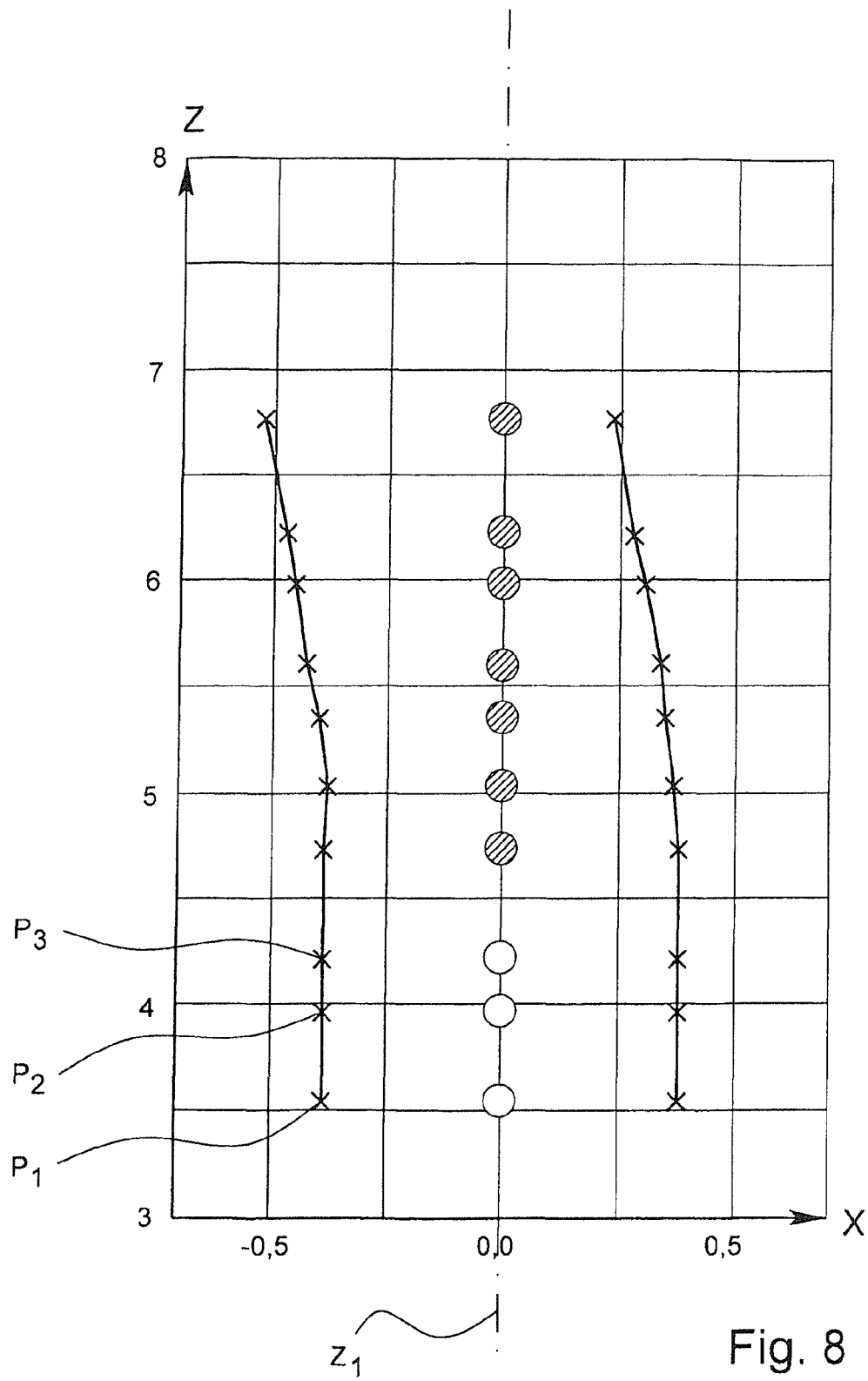
Figure 9:
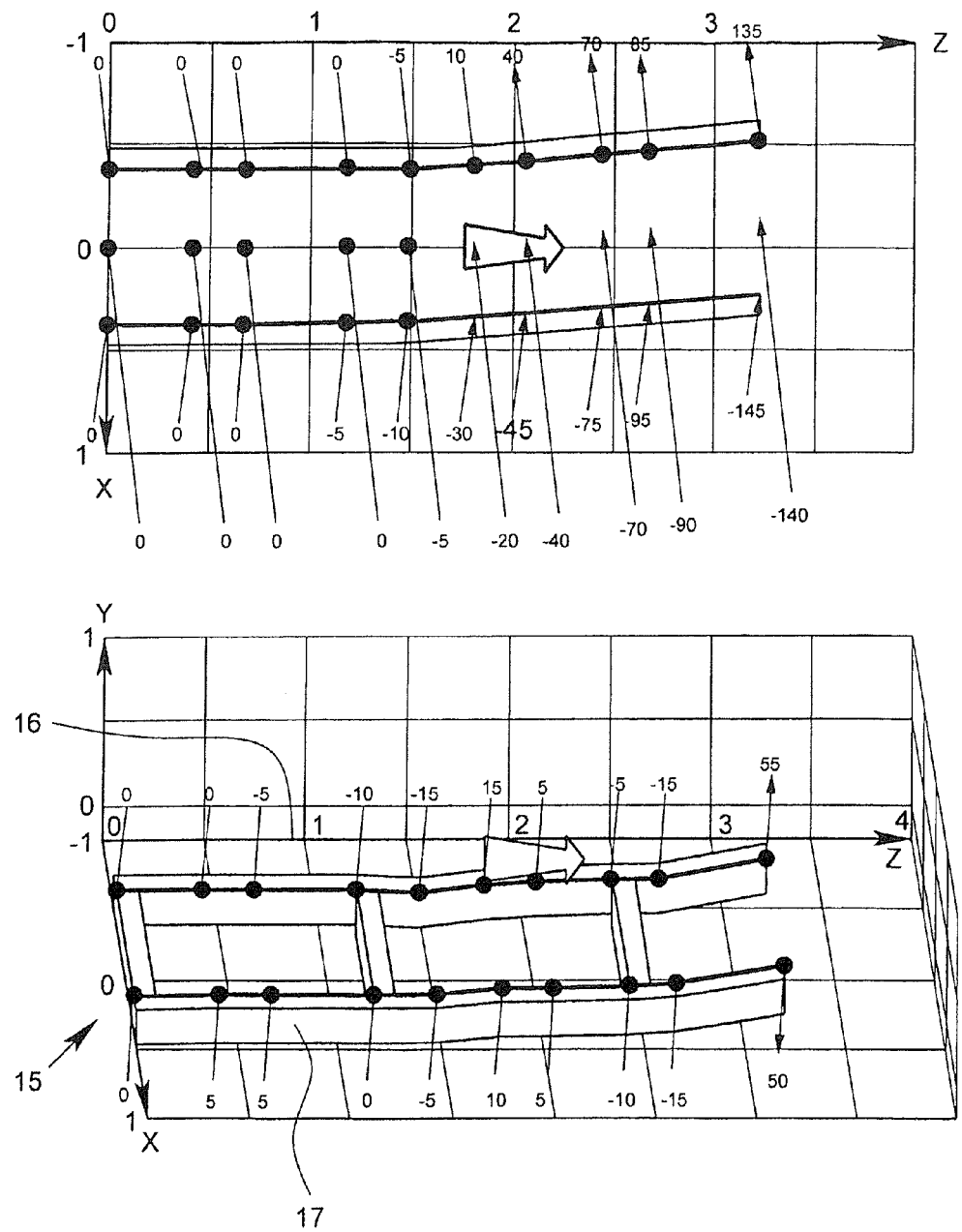

According to FIG. 8, from the measurement point pairs $P_1$ to $P_3$ of the two outer reflectors 2, 3, which pairs have been established to determined the straight line segment 24, the geometrical center line $Z_1$ of the frame in the X-Z plane of space and the respective deviation of the measurement points P in the horizontal direction X from the geometrical center line $Z_1$ of the frame are determined; this is shown in FIG. 9. It is not shown that a geometrical center line of the frame in the Y-Z frame is also preferably determined and the respective deviation of the measurement points P from the geometrical center line of the frame in the Y-Z plane in the vertical direction Y is determined.

As a result, the described method makes it possible to arrange the measurement device with the radiation source and the radiation detector for measuring the frame 15 while maintaining a minimum distance from the reflector support 1, optionally to the actual geometrical center line $Z_1$ of the frame 15, the center line $Z_1$ of the frame being derived from the disposition of the measurement points in the X-Z direction. Likewise, a center line of the frame in the Y-Z plane can be derived from the disposition of the measurement points in the Y-Z direction. In this way, less laborious and time-consuming measurement and testing of the frame 15 are enabled with high precision of the frame measurement.

Figure 10:
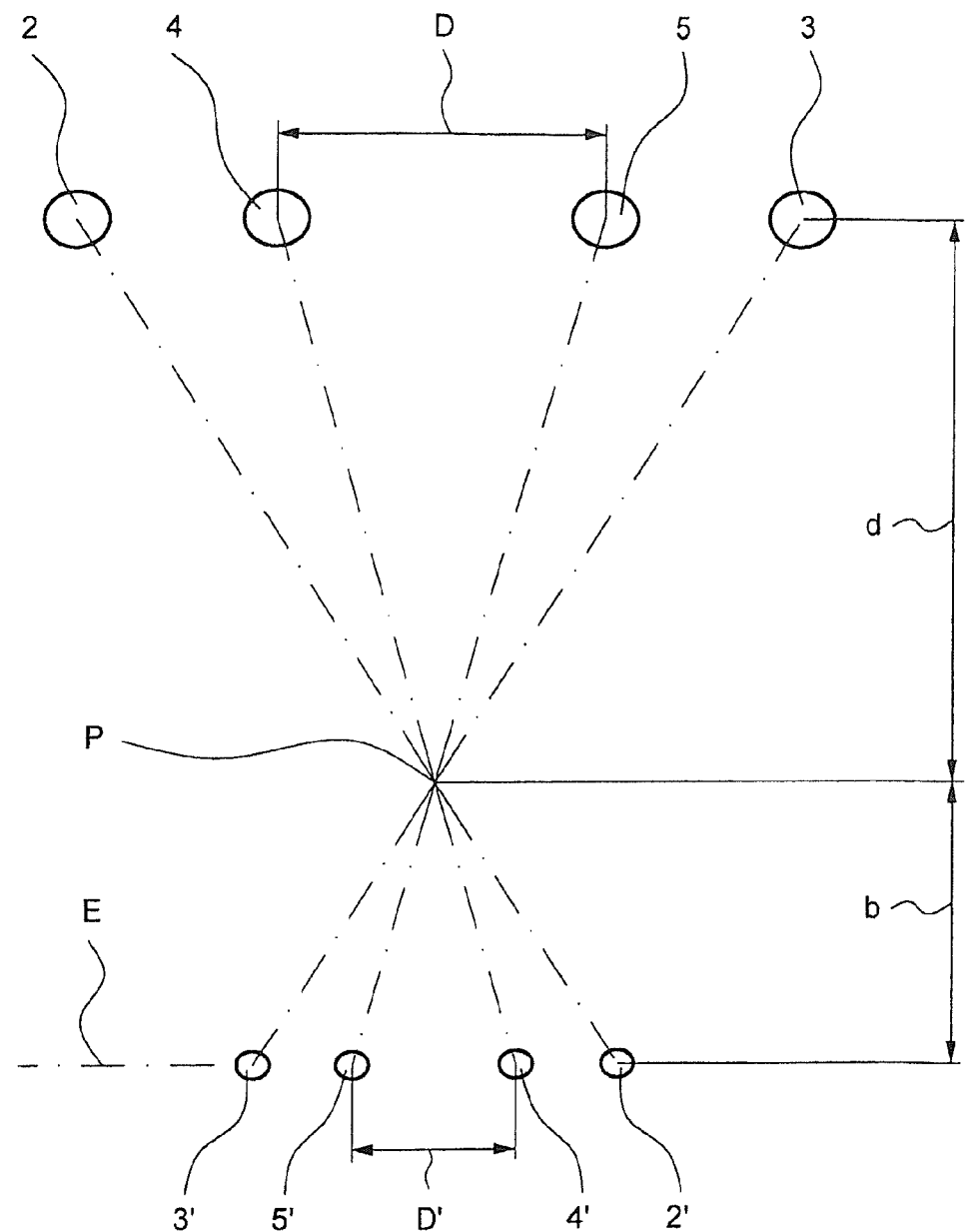
FIGS. 10 & 11 are schematic representations of the projections of the reflectors onto the image plane of a camera of a measurement device which can be used in the measurement and testing of the vehicle frame in accordance with the invention.
Figure 11:
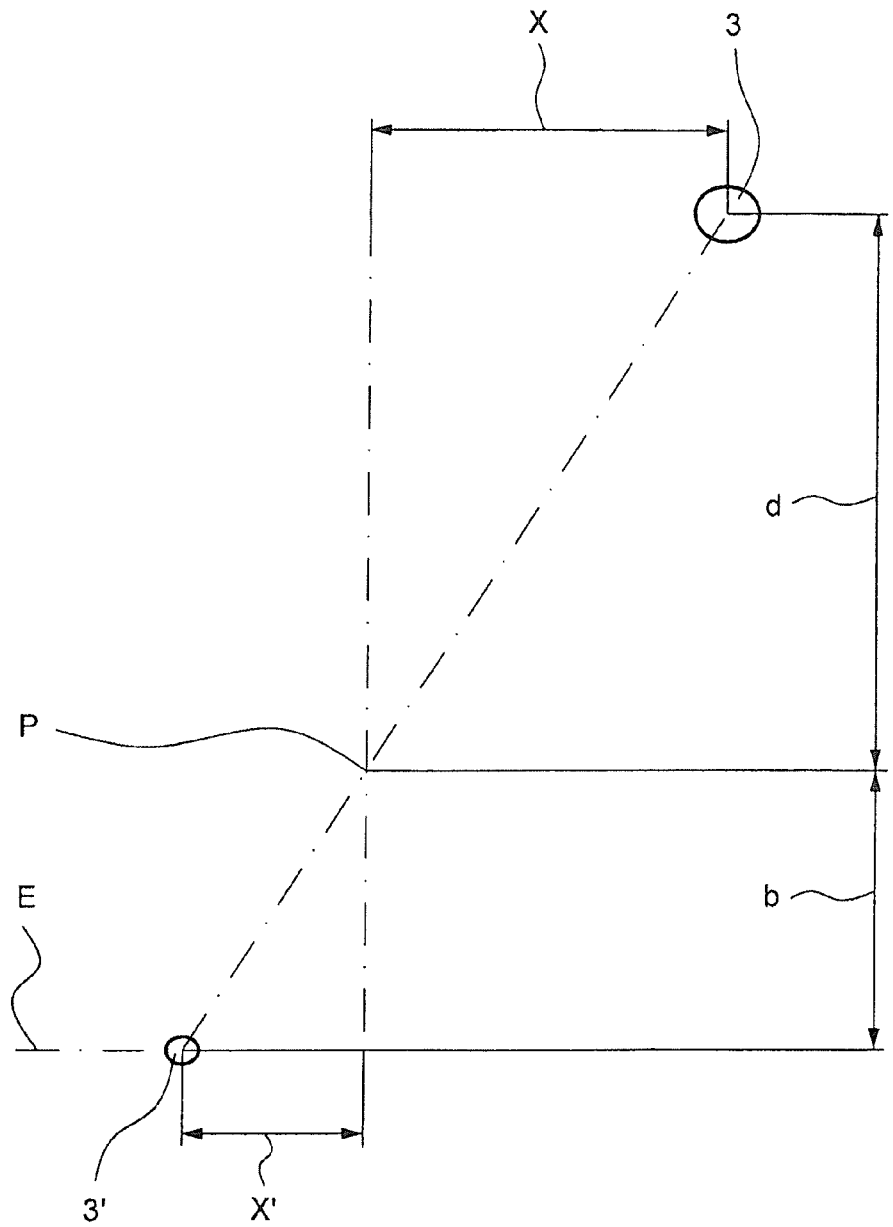

With reference to FIGS. 10 to 12, the determination of the coordinates of the reflectors 2, 3, 4, 5 and the masking-out of implausible regions 6' in a picture recording of the reflector support 1 obtained with the camera of the measurement device are explained in detail below. FIGS. 10 and 11 schematically show the projection of the reflectors 2, 3, 4, 5 onto the image plane E of the camera. The camera has the projection center P. The use of the four-distance theorem leads to the equality of the following ratios according to the general relation (I):

$$\frac{d}{D} = \frac{b}{D'} \qquad (I)$$

where d is the distance of the reflector support 1—camera (projection center P)
b is the image distance of the camera (known)
D is the distance of the inner reflectors 4, 5 (known)
D' is the distance of the white regions 4', 5' in the picture recording (automatically determined).

The desired distance d of the reflector support 1 from the camera follows from the equation (II):

$$d = b \cdot \frac{D}{D'} \qquad (II)$$

According to FIG. 11 the four-distance theorem also leads to the equality of the following ratios according to equation (III):

$$\frac{X}{d} = \frac{X'}{b} \qquad (III)$$

where d is the distance of the reflector support 1—camera (projection center P)
b is the image distance of the camera (known)

X is the X coordinate for example of the outer reflector 3 (distance to the measurement axis)

X' is the X coordinate of the outer white region 3' in the picture recording (distance to the image center).

This yields the X coordinate, for example, for the outer reflector 3 from equation (IV):

$$X = X' \cdot \frac{d}{b} \qquad (IV)$$

The Y coordinate, for example, of the outer reflector 3 follows analogously from the following equation (V):

$$Y = Y' \cdot \frac{D}{D'} \qquad (V)$$

where

Y is the Y coordinate for example of the outer reflector 3 (distance to the measurement axis)

Y' is the Y coordinate of the outer white region 3' in the picture recording (distance to the image center).

With reference to FIG. 12, possibilities are described below for masking out an implausible region 6' in a picture recording, i.e., for leaving it ignored in the determination of the local coordinates of the reflectors 2, 3, 4, 5. FIG. 12 schematically shows a picture recording of the reflector support 1, the radiation which has been reflected by the reflectors 2, 3, 4, 5 appearing as circular white regions 2', 3', 4', 5' in the picture recording. Moreover, a further circular region 6' is contained in the picture which is "implausible" for the purposes of the invention and cannot be attributed to the radiation which has been reflected on one of the reflectors 2, 3, 4, 5. Instead, it is attributable to reflection on another object in the region of the frame 15. For example, an implausible region 6' can be caused by the reflection of radiation on bare metal parts of the frame 15.

An implausible region 6' can preferably be masked out on the basis of the geometrical data of the other plausible regions 2', 3', 4', 5' in the picture recording. The reflectors 2, 3, 4, 5 on the reflector support 1 are the same size, are round and lie on one line. Accordingly the white regions 2', 3', 4', 5' in the picture recording which can be attributed to radiation reflection on the reflectors 2, 3, 4, 5 also lie on one line. "Plausible" white regions 2', 3', 4', 5' in the picture can be those which are circular for which three other regions 2', 3', 4', 5' of similar size exist and which lie on one line with three other regions 2', 3', 4', 5'.

Plausible regions 2', 3', 4', 5' are essentially circular and have a ratio of height to width of roughly 1. If the ratio is smaller than, for example, 0.75 ratio or larger than, for example, 1.35 ratio, such an implausible region 6' can be masked out.

In a plausible circular region 2', 3', 4', 5', the ratio of area to the product of the width and height of a plausible region 2', 3', 4', 5' is roughly 0.79. If the ratio is smaller than, for example 0.6, such an implausible region 6' can be masked out. In this way, deviations of shape of the plausible regions 2', 3', 4', 5' from the ideal circular shape can be taken into account, especially depending on the distance to the reflector support 1.

Alternatively or in addition, to mask out an implausible region 6', it can be provided that, for each region 2', 3', 4', 5', 6', the number of regions of similar size is determined, whose size is, for example, between 50% and 150% of the examined region 2', 3', 4', 5'. If this number of regions of similar size is less than 3, this region 6' is implausible for the purposes of the invention and is not considered in the determination of the local coordinates of the reflector supports 2, 3, 4, 5.

In order to determine an implausible region 6', it can also be provided that the (four) white regions 2', 3', 4', 5' be determined which are located on a straight line or nearest to a straight line. The five white regions 2', 3', 4', 5', 6' shown in FIG. 12 should have, for example, the following coordinates:

| Region | x | y |
|--------|----|----|
| 2'     | 2  | 0  |
| 3'     | -2 | 0  |
| 4'     | 1  | 0  |
| 5'     | -1 | 0  |
| 6'     | 0  | 1  |

Proceeding from each white region 2', 3', 4', 5', 6' two different vectors are formed for every other white region 2', 3', 4', 5', 6'.

The following vectors are formed for the white region 2':

2'→3' (i.e., from region 2' to region 3')
2'→4'
2'→5'
2'→6'

From these vectors all possible combinations are formed, without a combination occurring in the reverse sequence. For example the following six combinations are formed for the white region 2'.

2'→3' and 2'→4'
2'→3' and 2'→5'
2'→3' and 2'→6'
2'→4' and 2'→5'
2'→4' and 2'→6'
2'→5' and 2'→6'

With the general representation $(x_1|y_1)$ and $(x_2|y_2)$ for two vectors$_{1,2}$, for each combination the amount s is computed according to equation (VI):

$$s = \left| \frac{x_1 \cdot x_2 + y_1 \cdot y_2}{\sqrt{(x_1^2 + y_1^2) \cdot (x_2^2 + y_2^2)}} \right| \qquad (VI)$$

Here, the amount s is the cosine which has been formed via the scalar product. Thus, the acute angle between the vectors is examined. The nearer the computed value to 1, the smaller the angle between the vectors. The computed values are recorded in a table for all white regions 2', 3', 4', 5', 6'. For the region 2', there is, for example, the following:

| Region 2' | | | | | |
|---|---|---|---|---|---|
|       | 2'→2' | 2'→3' | 2'→4' | 2'→5' | 2'→6' |
| 2'→2' | —     | —     | —     | —     | —     |
| 2'→3' | —     | —     | 1     | 1     | 0.89  |
| 2'→4' | —     | —     | —     | —     | 0.89  |
| 2'→5' | —     | —     | 1     | —     | 0.89  |
| 2'→6' | —     | —     | —     | —     | —     |

Unformed vectors and unexamined combinations are identified with a dash. For example, a vector 2'→2' cannot be formed because he same white region 2' is both the starting point and the destination point. Two identical vectors should not be included. Therefore, for example, the combination 2'→3' and 2'→3' is not examined. If for example the entry 2'→3' and 2'→4' is already present, the combination 2'→4' and 2'→3' may no longer be entered.

In the corresponding tables for all regions 2', 3', 4', 5', 6', the three largest entries are determined and the white regions 2', 3', 4', 5', 6' are sorted according to the sum of these three largest entries:

| Region | Largest entry | $2^{nd}$ Largest entry | $3^{rd}$ Largest entry | Sum |
|--------|---------------|------------------------|------------------------|-----|
| 2'     | 1             | 1                      | 1                      | 3.0 |
| 3'     | 1             | 1                      | 1                      | 3.0 |
| 4'     | 1             | 1                      | 1                      | 3.0 |
| 5'     | 1             | 1                      | 1                      | 3.0 |
| 6'     | 0.95          | 0.95                   | 0.60                   | 2.5 |

The uppermost four white regions 2', 3', 4', 5' are those which lie on a straight line or which have the shortest distance to a straight line. The white region 6' is "implausible" for the purposes of the invention and is not considered in the determination of the local coordinates of the reflector supports 2, 3, 4, 5.

In order to further increase the reliability, preferably vectors can be formed only between regions 2', 3', 4', 5' (with a tolerance of ±5%) which have a similar size. Since the reflectors 2, 3, 4, 5 are located roughly horizontally on the reflector support 1, preferably only vectors can be examined which form an angle smaller than 18° with the horizontal. These measures reduce the computer cost in the determination of 2', 3', 4', 5' and implausible regions 6' since the number of combinations to be examined decreases.

What is claimed is:

1. A method for measuring and testing a vehicle frame, comprising the steps of:

locating a measurement device which has a radiation source and a radiation detector in front of the frame, emitting radiation from the radiation source in a direction toward the frame onto a reflector support having at least one reflector, the reflector being assigned to a part of the frame and the assigned reflector being held on the frame part, reflecting the radiation from the reflector onto the radiation detector, and determining local coordinates of the reflector with the measurement device at different measurement sites of the frame part, an essentially undeformed section of the frame part being determined from measurement points which have been obtained in this way and using the distance of measurement points from the undeformed section as a measure of deformation of the frame, wherein the reflector support, in a horizontal transverse direction, has a first outer reflector and an opposite second outer reflector, the distance between the outer reflectors being adjustable such that the outer reflectors have a continually identical distance relative to the geometrical center of the reflector support, the two outer reflectors being assigned to outer frame parts which are provided on opposite longitudinal sides of the frame and wherein the local coordinates of the outer reflectors are determined jointly by the measurement device.

2. The method as claimed in claim 1, wherein a geometrical center line of the frame is determined from jointly determined measurement points of the two outer reflectors.

3. The method as claimed in claim 1, wherein the local coordinates of the reflectors are determined at different distances in the longitudinal direction of the frame.

4. The method as claimed in claim 1, wherein the reflector is located within a region bordered by the outside surfaces of the frame.

5. An arrangement for measuring and testing a vehicle frame, comprising:

a reflector support having support means for supporting the reflector support on a vehicle frame and two outer reflectors, a distance between the outer reflectors being adjustable such that the reflectors continually are identically spaced from a geometrical center of the reflector support, a measurement device which has a radiation source and a radiation detector, and a computer device adapted for determining local coordinates of the reflectors with the measurement device at different measurement sites of the frame part, for determining an essentially undeformed section of the frame part from measurement points which have been obtained in this way and for using the distance of measurement points from the undeformed section as a measure of deformation of the frame.

6. The arrangement as claimed in claim 5, wherein the reflector support has two inner stationary reflectors which are arranged at a fixed distance relative to one another, the inner reflectors continually being identically spaced from the geometrical center of the reflector support.

7. The arrangement as claimed in claim 5, wherein the inner reflectors and the outer reflectors are mounted on a common axle and/or wherein the reflectors are arranged to be synchronously adjustable in the vertical direction.

* * * * *